United States Patent
Thiessen et al.

(10) Patent No.: US 7,464,218 B2
(45) Date of Patent: Dec. 9, 2008

(54) METHOD FOR IMPROVING DATA THROUGHPUT FOR A DATA STORAGE DEVICE

(75) Inventors: Mark A. Thiessen, Mustang, OK (US); Edwin S. Olds, Fort Collins, CO (US); Travis D. Fox, Edmond, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 267 days.

(21) Appl. No.: 10/930,474

(22) Filed: Aug. 31, 2004

(65) Prior Publication Data

US 2006/0047897 A1 Mar. 2, 2006

(51) Int. Cl.
G06F 13/14 (2006.01)
(52) U.S. Cl. ...................................... 711/112
(58) Field of Classification Search ................... 711/112
See application file for complete search history.

(56) References Cited

U.S. PATENT DOCUMENTS

| | | | |
|---|---|---|---|
| 5,890,213 A | 3/1999 | Sokolov | |
| 6,092,149 A | 7/2000 | Hicken | |
| 6,301,639 B1 | 10/2001 | Cleavinger | |
| 6,408,357 B1 | 6/2002 | Hanmann | |
| 6,505,284 B1 * | 1/2003 | Rabinovici et al. | 711/170 |
| 6,571,298 B1 * | 5/2003 | Megiddo | 710/5 |
| 6,804,751 B2 * | 10/2004 | Espeseth et al. | 711/158 |
| 2003/0056059 A1 * | 3/2003 | Fox et al. | 711/112 |
| 2003/0070045 A1 | 4/2003 | Dwyer | |
| 2003/0070065 A1 | 4/2003 | Fleming | |
| 2003/0149838 A1 * | 8/2003 | Mowery et al. | 711/113 |

* cited by examiner

*Primary Examiner*—Gary J Portka
*Assistant Examiner*—Shawn Eland
(74) *Attorney, Agent, or Firm*—Fellers, Snider, et al.

(57) ABSTRACT

A method for improving throughput performance of a data storage device by executing an execution critical write-back data priority routine programmed into a controller of the data storage device. The method includes, determining a write-back data aging threshold limit; identifying and executing a pending command; recognizing write-back data exceeding the aging threshold limit as an ending position aged data execution command; determining a read/write head following an execution of a pending command; determining a latency portion of the aged data execution command based on the determined head position; ascertaining a total execution time for each of a plurality of commands based on the determined head position; selecting from the plurality of commands an additional command executable within the determined latency portion; and executing both the additional command and the aged data execution command following execution of the pending command, when the total execution time of the aged data execution command is unaffected.

21 Claims, 5 Drawing Sheets

METHOD FOR IMPROVING DATA THROUGHPUT FOR A DATA STORAGE DEVICE

FIELD OF THE INVENTION

This invention relates generally to the field of data storage devices, and more particularly, but not by way of limitation, to a method for improving data throughput performance and consistency of data throughput performance of a data storage device.

BACKGROUND

Disc drives are digital data storage devices which store and retrieve large amounts of user data in a fast and efficient manner. A housing encloses one or more storage media and associated transducing heads which are used to write and subsequently retrieve the user data for a host device. The heads are typically supported adjacent the disc surfaces by fluidic pressures established by the high speed rotation of the discs.

The data storage device (DSD) market continues to place pressure on the industry for DSD's with higher data throughput performance, i.e., data throughput performance as perceived by the host communicating with the DSD. One technique of improving data throughput performance is to delay the physical act of writing data sent by the host (i.e., write data) to the DSD by caching the write data to a buffer memory, storing the write command associated with the write data in a command queue, and reporting a command complete to the host. However, caching write data exposes the data to potential loss through a malfunction of, or loss of power by the buffer memory. One way of reducing the risk of data loss, without incurring an adverse impact on throughput performance, is to nest execution of write commands between consecutive read commands.

Another way of reducing the risk of data loss is to assure the data residing in the buffer memory is allowed to remain in the buffer memory for not more than a predetermined period of time. However, upon expenditure of the predetermined period of time, a write command associated with the write data is scheduled as the next command for execution and the write data is written to the disc. Often times, because of the predetermined operating constraints of the DSD, the cached write data must be written to the disc regardless of the impact on throughput performance, and throughput performance is disadvantageously impacted.

As such, challenges remain and needs persist for improving data throughput performance and consistency of data throughput performance of a DSD.

SUMMARY OF THE INVENTION

In accordance with preferred embodiments, a method for improving throughput performance of a data storage device is provided through execution of an aged data execution priority routine by a controller of the data storage device. The method includes, identifying a latency portion of a total access time of an aged data execution command, and executing an additional command within the identified latency portion during execution of the aged data execution command, when the total execution time of the aged data execution command is unaffected.

In an alternate preferred embodiment, an apparatus includes a head-media combination servicing data storage need of a host, and a controller programmed with an aged data execution priority routine and communicating between the head-media combination and the host, wherein upon execution of the aged data execution priority routine, data throughput is improved between the host and an head-media combination.

In a further preferred embodiment, the controller is programmed with a speculative data retention routine, a pending command prioritization routine, a write-back aging routine, and the aged data execution priority routine, wherein each of these routines improves data throughput between the host and the head-media combination when executed by the controller.

These and various other features and advantages which characterize the claimed invention will become apparent upon reading the following detailed description and upon reviewing the associated drawings.

DETAILED DESCRIPTION

Figure 1:
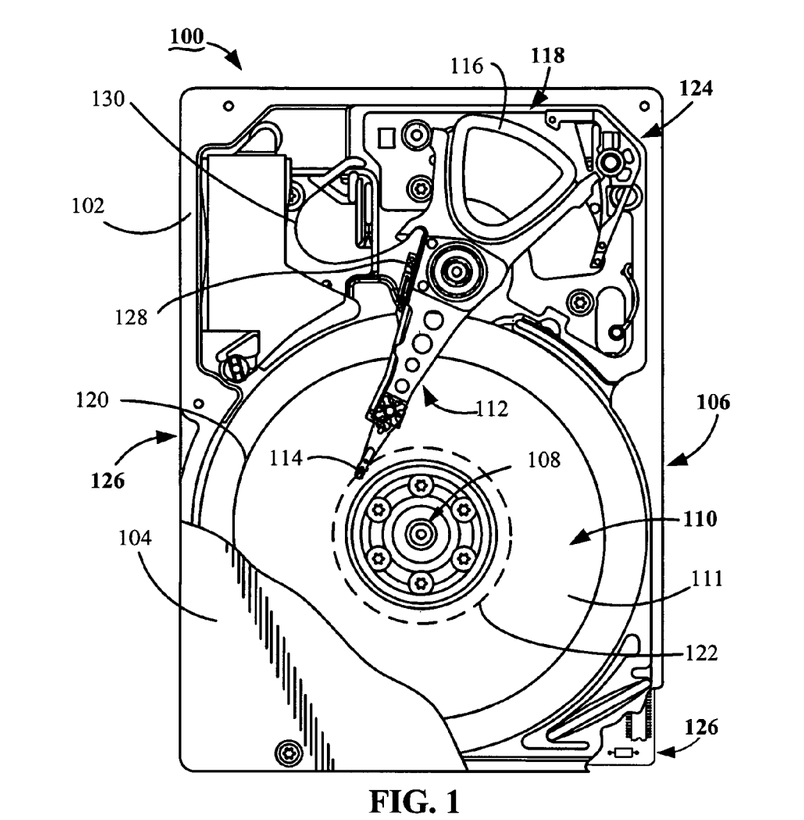
FIG. 1 is a top plan view of a data storage device incorporating preferred embodiments of the present invention.
Figure 2:
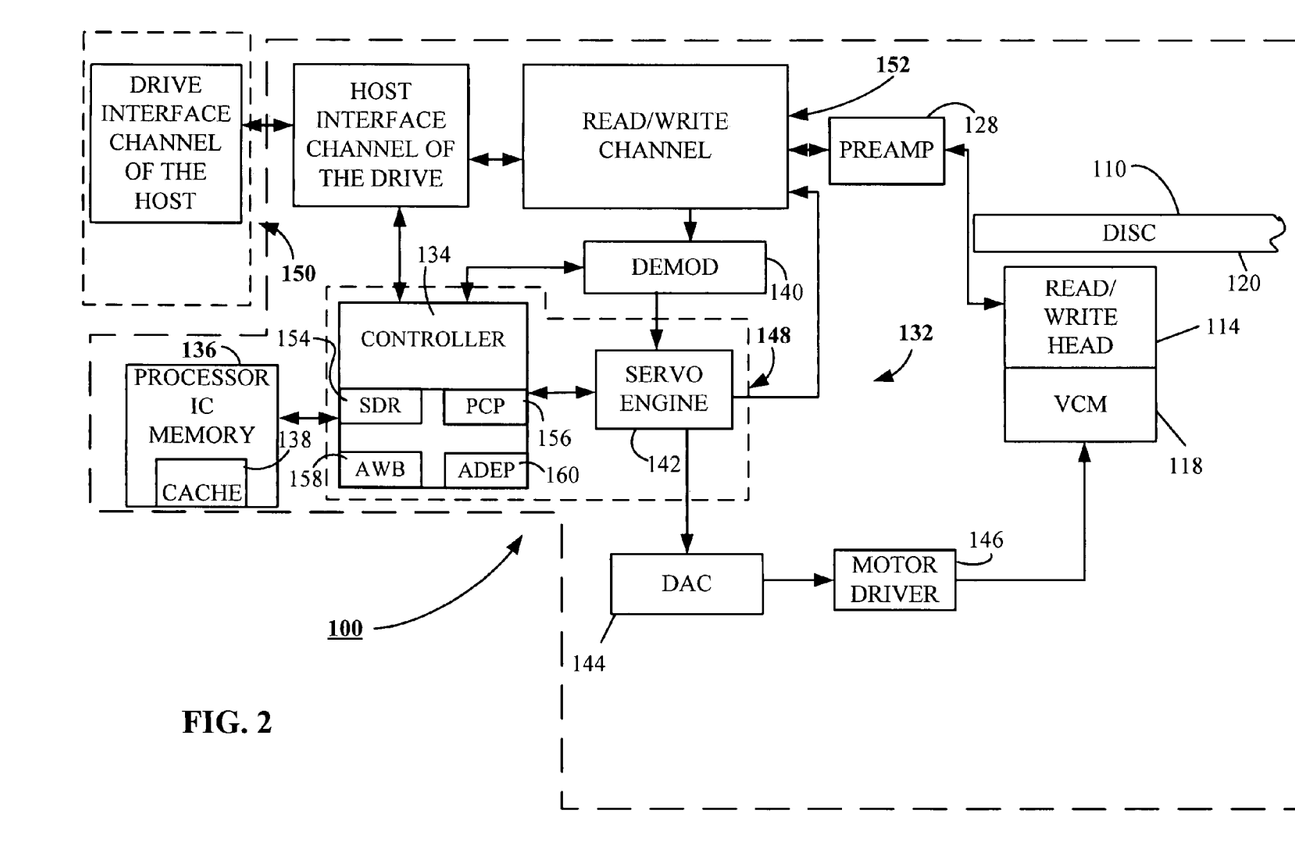
FIG. 2 is a functional block diagram of a circuit for controlling operation of the data storage device of FIG. 1, and a write-back aging routine (AWB).

To illustrate an exemplary environment in which presently preferred embodiments of the present invention can be advantageously practiced, FIG. 1 shows a data storage device 100 of the type configured to store and retrieve digital data for a host device (such as 150 of FIG. 2).

In reference to the drawings, the DSD 100 includes a rigid base deck 102 cooperating with a top cover 104 (shown in partial cutaway) to form a sealed housing for a mechanical portion of the DSD 100, referred to as a head-media combination 106. A spindle motor assembly 108 rotates a number of data storage discs 110 at a substantially constant speed, wherein each disc 110 includes a recording surface 111. A rotary actuator 112 supports and rotates a number of read/write heads 114 adjacent the recording surface 111, for transfer of data between a selected head 114 and a selected data track 120 of the storage disc 110.

When the DSD 100 is deactivated, the actuator 112 may position the heads 114 adjacent a home position 122 and be confined by a toggle latch 124, or the actuator 112 may park the heads 114 adjacent a ramp-load mechanism (not shown).

Control and interface electronics for the DSD 100, are provided on a printed circuit board assembly 126 mounted to the head-media combination 106. Operational control of the data storage device is provided by firmware executed by a micro-processor controller (not separately shown) of the printed circuit board assembly 126. During data transfer operations, a preamplifier/driver (preamp) 128 attached to a flex circuit 130, conditions read/write signals conducted by the flex circuit 130 between the printed circuit board assembly 126 and the read/write head 114.

Turning to FIG. 2, position-controlling of the read/write head 114 is provided by the positioning mechanism (not separately shown) operating under the control of a servo control circuit 132 programmed with servo control code, which forms a servo control loop.

The servo control circuit 132 includes a micro-processor controller 134, a memory (either volatile or non-volatile) 136, a cache memory 138, a demodulator (DEMOD) 140, an application specific integrated circuit (ASIC) hardware-based servo controller ("servo engine") 142, a digital to analog converter (DAC) 144 and a motor driver circuit 146. Optionally, the controller 134, the memory 136, and the servo engine 142 are portions of a control ACIS 148.

The components of the servo control circuit 132 are utilized to facilitate track following algorithms used in controlling the VCM 118 to position-control the read/write head 114 relative to a selected information data track 120.

In addition to the servo control code programmed into the control ASIC 148, interface control code is also programmed into the control ASIC 148 and used for executing and controlling data transfer functions between a host 150 and the DSD 100. Operating under the control of the controller 134, data received from the host 150 is placed in the cache memory 138 for transfer to the disc 110 by read/write channel electronics (channel) 152. Read data requested by the host 150, not found in cache memory 138, are read by the read/write head 114 from the information data track 120, processed by the channel 152, and stored in the cache memory 138 for subsequent transfer to the host 150.

Preferably, a portion of the memory 136 is used as the cache memory 138 for storage of data read from the information data track 120 (of FIG. 1), and awaiting transfer to the host 150. The cache memory is also used for caching write-back data, i.e., data transferred from the host to the DSD 100 to be written to the information data track 120 at a later, more advantageous time. Preferably, the information data track 120 is divided into a plurality of data-sectors of fixed length, for example 512 bytes.

Similarly, the cache memory 138 portion of the memory 136 is sectioned into a plurality of data blocks of either fixed length (sometimes referred to as segments), or variable length (sometimes referred to as fragments). Each fixed length data block is substantially sized to accommodate one of the plurality of fixed length data-sectors of the information data track 120. For example, under a buffer memory or cache management scheme, the plurality of data blocks are grouped into a plurality of fixed length memory segments within, for instance, an 8 MB cache memory.

As cache memory is needed to store data read from the disc 110, or write data received from the host 150, segments are assigned (via pointers) in the control code. Once a segment has been assigned, that portion of the cache memory is consumed in its entirety. The cache memory is also used for storing pending command queues, scheduled command execution queues, write-back command aging queues, and for servicing various operational needs of the DSD 100 as discussed further herein below.

The amount of memory 136 dedicated to cache memory 138 is limited, effective utilization of the cache memory 138 is important to the overall operating performance of the DSD 100. To maximize overall throughput performance of the DSD 100, the DSD 100 incorporates a speculative data retention routine (SDR) 154, a pending command prioritization routine (PCP) 156, a write-back aging routine (AWB) 158, and an aged data execution priority routine (ADEP) 160.

Preferably, to maximize the effective utilization of the cache memory 138, read data in the form of speculative data is frequently retrieved with requested host data from the disc 110 during a seek operation and placed in the cache memory 138. The speculative data is gathered in an attempt to avoid a future mechanical seek to the disc 110 for retrieval of data requested by the host 150. By satisfying a request for data from the host 150 out of the cache memory 138, use of the mechanical components of the DSD 100 is avoided, thereby increasing data throughput performance by the DSD 100.

In response to an alternate need for the cache memory 138, the controller 134 executes the SDR 154 to prioritize removal of host data from the cache memory 138 prior to removal of read on arrival speculative data, while maintaining persistence of the read look ahead speculative data in the cache memory 138 if the alternate need for cache memory 138 has been satisfied by the removal of the read on arrival data and the host data.

PCP 156 involves giving command execution preference to pending commands in a priority queue. In other words, host commands received by the DSD 100 during execution of a prior host command are placed in a pending command queue. The commands are analyzed for processing in the most efficient manner and placed in a preferred scheduling order in a scheduling queue and processed in the order they appear in the scheduling queue. One efficient manner of ordering the pending commands in the scheduling queue, is to order the execution of the pending commands in a manner that minimizes movement of the read/write head 114 relative to the disc 110, between execution of the scheduled (or ordered) commands.

In particular, PCP 156 involves identifying a pending command for execution, and executing other commands (including queued write commands associated with write-back data residing in the cache memory 138) in route to execution of the identified pending command, when throughput performance is not penalized by doing so. A pending command is a command issued by the host 150 to the DSD 100 to either write data to or read data from the disc 110, and which the DSD 100 has not issued a command complete signal back to the host 150.

A command complete signal is sent by the DSD 100 to the host 150 upon, transferring requested read data to the host 150; successfully writing data to the disc 110 sent by the host 150; or having successfully written write data sent by the host 150 to the cache memory 138. Write data sent to the cache memory is referred to herein as write-back data, or dirty data (DD).

DD residing in the cache memory 138 is written to the disc 110 at a later more advantageous time. For example, an advantageous time for writing the DD to the disc would be when following condition occurs, the read/write head 114 is in route to an execution of a pending command; the beginning sector for writing the DD could be encountered in route to execution of the pending command; and sufficient time is available for writing the DD to the disc 110 without expanding a total access time associated with execution of the pending command.

For purposes of the present disclosure, a command includes a read/write head positioning portion and a disc access portion. The term "total execution time" for a command includes a total access time portion and a total data transfer time portion. Total data transfer time is an amount of time taken to either, physically write data to, or physically read data from the disc 110 during a disc access. In other words, for purposes of the present disclosure, the amount of time taken for a disc access depends on the amount of data to be transferred between the disc 110 and the read/write head 114.

Total access time includes, a command processing time; a seek time; a settle time; and a rotational latency time. Command processing time is typically the time needed by the controller 134 to determine the type of task to be executed, and setting up the balance of the control circuits for execution of the command. Seek time is the time required for the read/write head 114 to radially move across information data tracks 120 occurring between the current data track being serviced by the read/write head 114, and a target data track to be serviced by the read/write head 114. Settle time is an amount of time needed by the read/write head 114 to "come on track" at the target data track (i.e., essentially establishing a capability of sustaining a data interchange relationship between the read/write head 114 and the target data track). Rotational latency time is the amount of time spent waiting for the appropriate data sector to rotate under the read/write head 114, once the read/write head comes on track. It is noted that the rotational latency time is a significant part of the total access time for all but the longest seeks. On average, it is the dominant component of the total access time for relatively short seeks.

Because the command processing time, seek time, and settle time components of the total access time must occur prior to execution of the pending command, and if upon expenditure of those times, the lead in portion of the appropriate data sector of the pending command is present, the pending command is executed and no time remains for writing additional DD to the disc 110. In other words, the rotational latency time portion of total access time is typically the time available for writing DD to the disc 110, while in route to execution of a pending command.

The AWB 158 improves the utility of the cache memory 138 and the operational efficiency of the DSD 100. In a preferred embodiment, when a write command is received by the DSD 100 from the host 150, the DSD 100 will store the write command in the cache memory 138, as DD, which will be written to the disc 110 at a future time. The cache memory 138 provides a throughput performance advantage by reporting to the host 150 a command completed once the data has been validated and received into the cache memory 138. Writing the data to the disc is typically a much longer process than a host data transfer, and by deferring the data write operation until a time selected by the DSD 100 (a time in which the host 150 is not requesting service by the DSD 100), the write time is hidden from the host 150 and does not impact throughput performance.

As an example, but not by way of limitation, the AWB 158 selected for purposes of disclosure incorporates a method for determining an aging period for retaining DD in the cache memory 138, based on a proportional utilization level of the cache memory 138 by the DD. That is, as the level of cache memory 138 utilization by the DD increases, the amount of time the DD is allowed to persist in the cache memory 138 decreases. The aging period takes a form of an aging threshold limit, which differs depending on the cache memory 138 utilization level, i.e., an amount of cache memory utilized by the DD.

Preferably, the method includes, identifying the memory utilization level; selecting the data aging threshold limit based on the memory utilization level; and writing the data from the cache memory 138 to the disc 110 when an age of the data residing in the memory exceeds the selected data aging threshold limit.

While it is preferable that DD be written to the disc in a timely manner, a benefit to an enhanced throughput performance has been found by setting an aging limit for the DD residing in the cache memory 138. For purposes of illustration, and not by way of limitations, the aging limit is set to facilitate retention in the cache memory 138 for a certain amount of time before the DD is considered a candidate for execution.

Without the imposition of limitations on the present invention, an exemplary embodiment of the AWB 158 operates as follows, if the utilization level of the cache memory 138 was determined to be below a 40 percent level, an aging limit of 36 milliseconds would be selected as the data aging threshold limit. However, if the utilization level of the cache memory 138 was determined to be at a level between 40 and 60 percent, an aging limit of 12 milliseconds would be selected as the data aging threshold limit, or if the utilization level of the cache memory 138 was determined to be above 60 percent, an aging limit of one millisecond would be selected as the data aging threshold limit.

In each case, once the DD attains or exceeds an applicable aging limit, i.e., the DD has attained the assigned data aging threshold limit, the command associated with the aged DD is designated as an aged write-back data execution priority command. In a preferred embodiment, upon identification of aged DD as aged write-back DD, the controller 134 executes the aged data execution priority routine (ADEP) 160.

The ADEP 160 determines, the total access time needed for execution of the scheduled aged write-back DD; identifies the latency portion of the determined total access time; determines qualified additional pending, scheduled, or queued write-back commands that could be processed within the identified latency portion; selects an alternate seek path for execution of additional qualified commands in route to execution of the aged write-back DD; and executes the additional qualified commands in conjunction with execution of the aged write-back DD.

Figure 3:
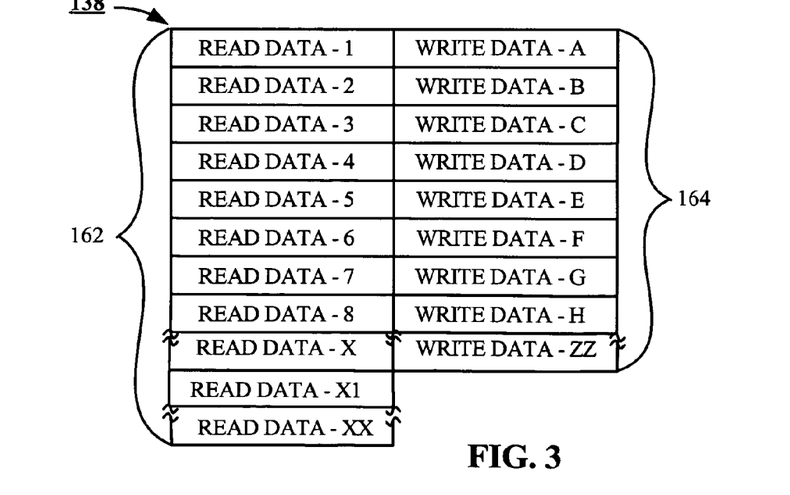
FIG. 3 is a tabular representation of write data and read data in a cache memory of the circuit of FIG. 2.

FIG. 3 illustrates a memory management scheme for managing the cache memory 138. Although not necessarily physically segregated within the cache memory 138, read data 162 are associated, prioritized and maintained in a manner to heighten an opportunity of servicing a request from a host 150 (of FIG. 2), while write data (DD) 164 are held in an association with one another, according to a period of time each of the individual DD fragments have persisted in the cache memory 138.

In a preferred embodiment, the present invention contemplates grouping the individual DD fragments into groups of data that may be written to a storage media (such as disc 110), using a minimum number of disc accesses. When such data groupings are present, the individual DD within the data group having persisted in the cache memory 138 for the longest period of time is compared to the data aging threshold limit for determination of whether the data group has become an aged write-back data group. If the data group is an aged write-back data group, it becomes the next executed command, and the ADEP 160 (of FIG. 2) determines the latency portion of the total access time of the aged write-back data group. The latency portion serves as a basis for determining the practicality of executing commands in addition to the aged write-back data group.

Figure 4:
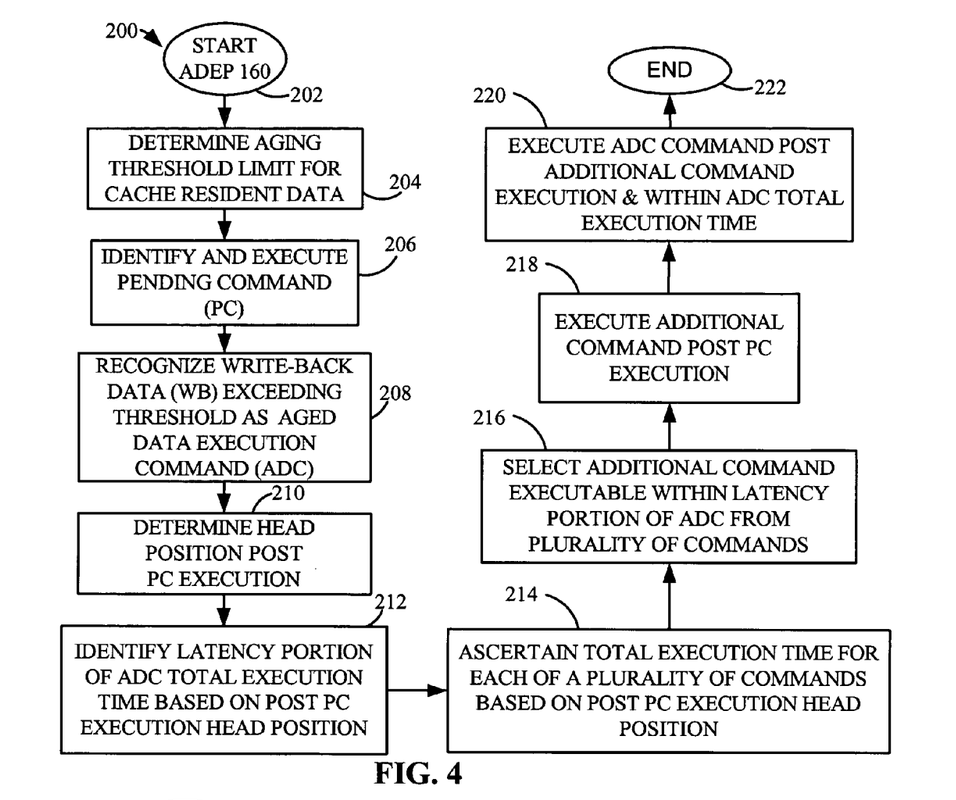
FIG. 4 is a flowchart of an embodiment of an aged data execution priority routine (ADEP), programmed into the circuit of FIG. 2.

FIG. 4 shows a flowchart 200 of steps of the ADEP 160 (of FIG. 2) beginning with start process step 202 and continuing at process step 204 with a determination of an aging threshold limit. The aging threshold limit is used for detecting when an upper limit of time has been reached for a data residing in a cache memory (such as 138). In a preferred embodiment, but not by way of limitation, once cache resident write-back data has attained the aging threshold limit, a disc command associated with the write-back data is designated as an aged data execution command, and will be processed ahead of other commands upon a first availability of a read/write channel (such as 152).

At process step 206, a pending command, or a plurality of pending commands grouped together for improved throughput efficiency, is identified and executed. At process step 208, any write-back data residing in the cache memory that has reached the aging threshold limit is recognized, and its associated disc command is designated as an aged data execution command. At process step 210, following execution of the identified command, an ending position of a read/write head (such as 114), is ascertained for use in determining a total execution time of the aged data execution command. Based on the ending position of the read/write head and a beginning position of the read/write head for writing the aged write-back data to a disc (such as 110), a total access time portion of the total execution time for the aged data execution command is determined.

At process step 212, a latency portion of the total access time portion is identified for use in determining whether or not other available commands could be processed in conjunction with the aged data execution command. That is, processed in conjunction with the aged data execution command without extending the total execution time for executing the aged data execution command. At process step 214, a total execution time for each available command is derived based on the ending position of the read/write head determined by process step 210. At process step 216, each of the derived total execution times for each of the available commands is compared to the latency portion of the aged data execution command determined in step 212.

Commands with total execution times that fall within the determined latency portion are evaluated as candidates for processing in conjunction with the aged data execution command. A command, or collective plurality of commands, that are executable within the latency portion, and do not, as a result of their execution, add to the total execution time of the aged data execution command are selected, as an additional command for execution in conjunction with execution of the aged data execution command.

At process step 218, the additional command selected in process step 216 is executed. At process step 220, the aged data execution command is executed, and the aged data execution priority routine 160 of process flowchart 200 concludes at end process step 222.

Figure 5:
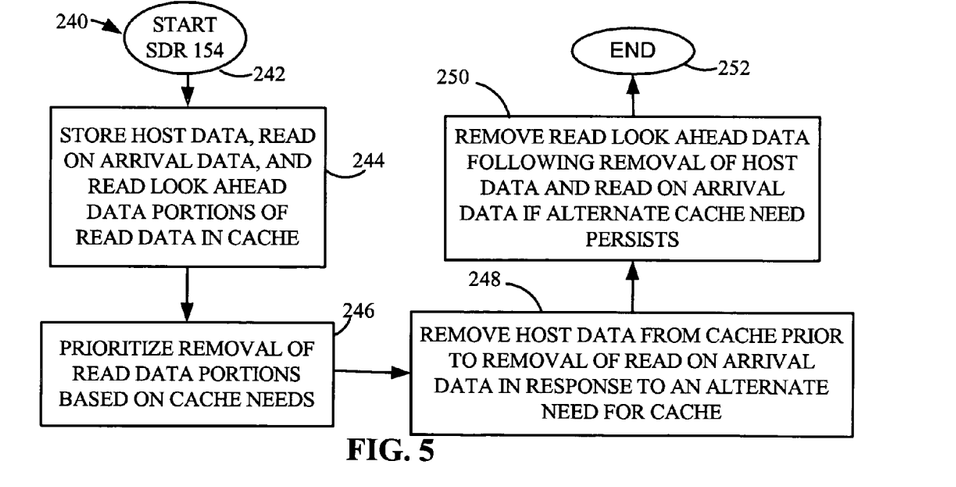
FIG. 5 is a flowchart of an embodiment of a speculative data retention routine (SDR), programmed into the circuit of FIG. 2.

FIG. 5 shows a flowchart 240 of steps of the speculative data retention routine (SDR) 154 (of FIG. 2) beginning with start process step 242 and continuing at process step 244 with storage of read data in a cache memory (such as 138). For purposes of disclosure, but not by way of limiting the present invention, the term "read data" shall be read to include, a host data portion (data specifically requested by a read data command of a host (such as 150); a read on arrival speculative data portion (data read in route to acquiring the host data), and a read look ahead speculative data portion (data acquired following acquisition of the host data), each of which are acquired during execution of a read data command issued by the host.

At process step 246, the three portions of the read data stored in the cache memory are prioritized for removal from the cache memory in response to an alternate need for the cache memory (for example, a need to store write-back data). Prioritization for removal of the read data portions is based on a predetermined evaluation of a future value of each portion's ability to satisfy a future data request from the host. In a preferred embodiment, but not by way of limitation, read look ahead speculative data is held to be of greatest future value, with read on arrival speculative data having the next most retention value, and host data having the least future value.

At process step 248, in response to an alternate need for cache memory, a host data portion of read data stored in the cache memory is removed from the cache memory prior to the removal of a read on arrival speculative data portion of the read data stored in the cache memory. At process step 250, a read look ahead speculative data portion of read data stored in the cache memory is removed from the cache memory following removal of the host data and the read on arrival speculative data portions of the read data, if the alternate cache need persists. The SDR process flowchart 240 concludes at end process step 252.

Figure 6:
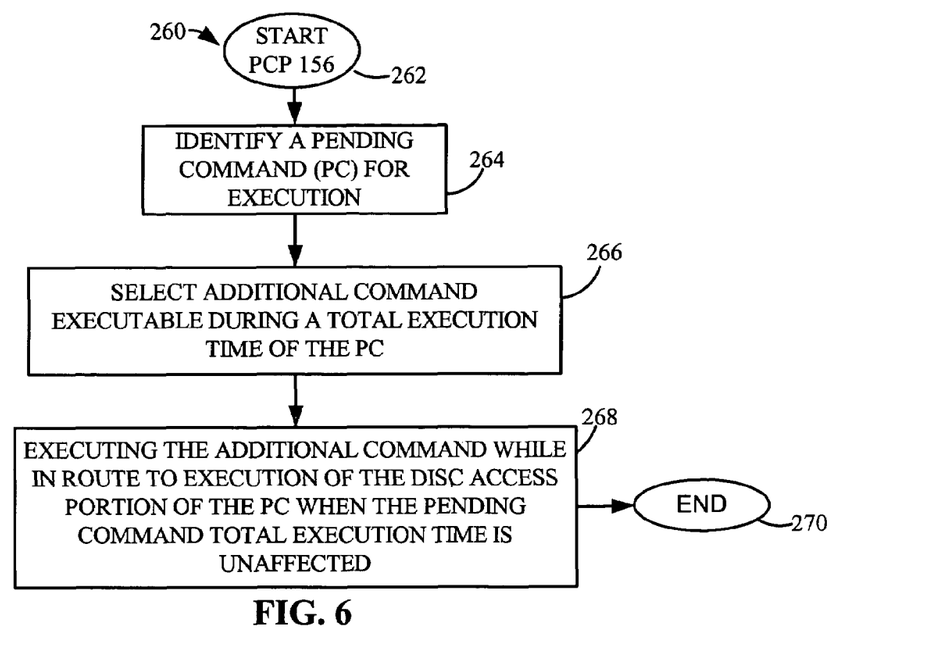
FIG. 6 is a flowchart of an embodiment a pending command prioritization routine (PCP), programmed into the circuit of FIG. 2.

FIG. 6 shows a flowchart 260 of steps of the pending command prioritization routine (PCP) 156 (of FIG. 2) beginning with start process step 262 and continuing at process step 264 with an identification of a pending command, or plurality of commands grouped together for execution efficiency, as a next command to be scheduled for execution. At process step 266, an alternate command, or commands, executable within the total execution time of the pending command, and without jeopardizing attainment of the total execution time of the pending command, is selected as an additional command. At process step 268, the additional command is executed while in route to an execution of the scheduled command, when the total execution time of the scheduled command is unaffected by the execution of the additional command. Upon execution of the additional command and the scheduled command, the process concludes at end process step 270.

Figure 7:
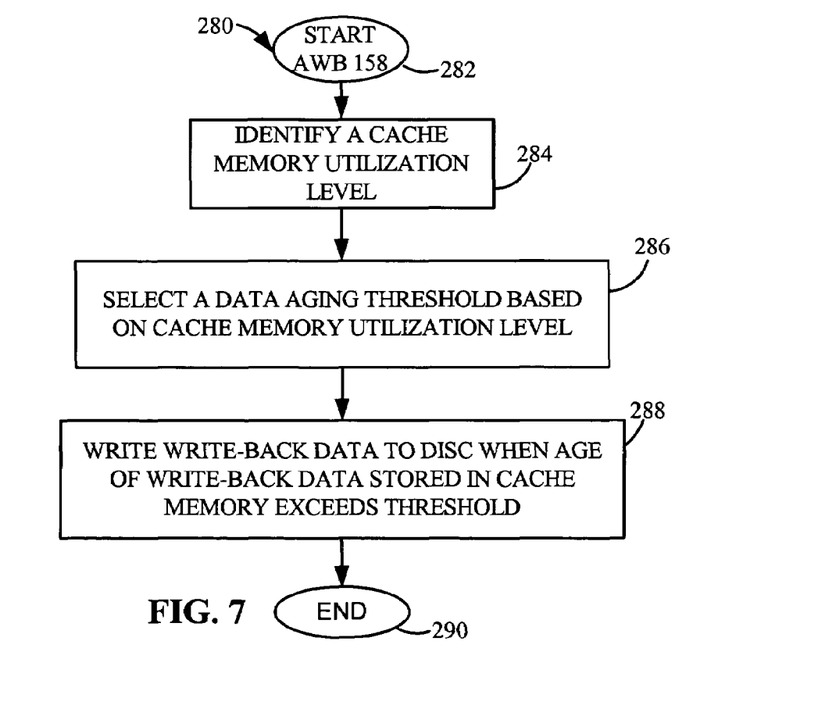
FIG. 7 is a flowchart of an embodiment of a write-back aging routine (AWB), programmed into the circuit of FIG. 2.

FIG. 7 shows a flowchart 280 of steps of the write-back aging routine (AWB) 158 (of FIG. 2) beginning with start process step 282 and continuing at process step 284 with an identification of a cache memory utilization level, or levels, for use in conjunction with a predetermined aging threshold limit, or limits. In a preferred embodiment, but not by way of limitation, a plurality of cache memory utilization levels, each with an associated aging threshold limit, are utilized for management of a cache memory (such as 138). When the utilization of the cache memory is relatively low, write-back data stored in the cache memory is allowed to persist for longer periods of time, than when the cache memory utilization is relatively high. That is, the aging threshold limit associated with a relatively low utilization of the cache memory is longer than an aging threshold limit associated with the relatively high utilization of the cache memory.

With an identification of the level of cache memory utilization made at process step 284, the process continues at process step 286 with a selection of an aging threshold limit that corresponds to the identified utilization level of the cache memory. At process step 288, when write-back data has remained in the cache memory for a period of time that exceeds the aging threshold limit selected in process step 286, the disc command associated with the aged write-back data is identified and scheduled for immediate execution and written to the disc. Upon execution of the disc command associated with the aged write-back data, the process concludes at end process step 290.

Figure 8:
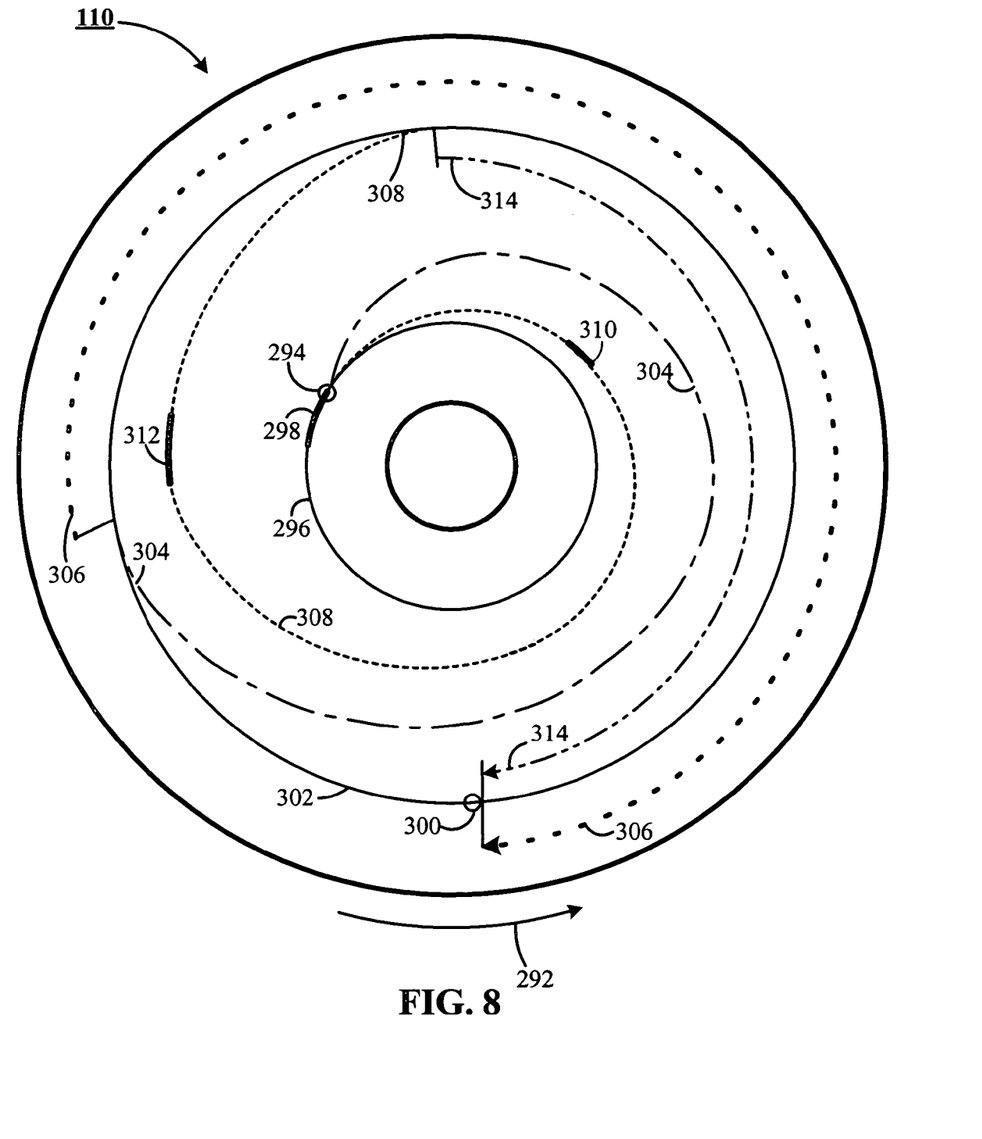
FIG. 8 is a graphical representation of a first read/write head seek path and an alternate read/write head seek path in which additional commands are executed.

FIG. 8, shows a plan view of the disc 110 illustrating, a direction of rotation as indicated by rotational vector 292; an ending position 294 of the read/write head 114 (of FIG. 1) relative to a first data track 296 upon completion of a disc access portion 298 of a command; a beginning position 300 of the read/write head 114 relative to a second data track 302; a first seek path 304 with an associated latency period 306; an alternate seek path 308 showing a first disc access 310, a second disc access 312, and its associated latency period 314.

For purposes of disclosure, but not by way of limitation, the disc access portion 298 represents read data acquired during execution of a pending command. The beginning position 300 represents a position for the read/write head 114 to be in, relative to the second data track 302, to write write-back data associated with an aged data execution command to the second data track 302. The first seek path 304 represents a path taken by the read/write head 114 during an uninterrupted track to track seek operation used to relocate the read/write head 114 from the first data track 296 to the second data track 302.

In a preferred embodiment, the latency period 306 is identified for use in determining whether or not there are alternate available commands executable within the identified latency period. If such commands are determined to be present, the uninterrupted first seek path 304 is altered to accommodate execution of the determined alternate command or commands. Alternate seek path 308 represents an altered seek path for the read/write head 114 to follow for executing alternate, additional commands while seeking from the first data track 296 to the second data track 302 during an execution procedure of the aged data execution command.

By altering the seek path between the first data track 296 and the second data track 302 (i.e., changing the seek profile from first seek path 304 to alternate seek path 308), the first disc access 310 of a first alternate command, and the second disc access 312 of a second alternate command can be executed during the track to track seek operation. By altering the track to track seek path, and by executing additional commands in route to execution of the aged data execution command, both a reduced latency portion 314 is obtained, and throughput performance efficiency increases. The increased throughput performance efficiencies are obtained through a reduction in data transfer idle time between the read/write head 114 and the disc 110. The idle time reduction is a result of the execution of the two additional commands in conjunction with the execution of the aged data execution command; all within the total execution time of the aged data execution command.

If the first and second disc access commands, 310 and 312 respectfully, were associated with requests for data from the host 150 (of FIG. 2), an improved data throughput would result. However, if the first and second disc access commands, 310 and 312 respectfully, were associated with write-back data, an avoidance of future aged data execution commands, involving those commands, would result.

The tables herein below show relative response improvements for a 10 k rpm product (such as DSD 100 of FIG. 1) operating with and without ADEP 160 (of FIG. 2) executed by the controller 134 (of FIG. 2). The following model parameters were selected for purposes of demonstration and disclosure enhancement and not by way of limitation. The model parameters selected are not absolute but are used to reasonably represent a drive's typical operating environment. The data sets were derived from a software simulation tool with the drive configured to operate at a queue depth of 4 commands (host side) and a block transfer size of 8 sectors. The model assumes 64 cache nodes for write caching which translates to 256 kB (512 B sectors*8 sector transfers*64 cache nodes).

The data stream was random across the full partition with a 50/50 read/write mixture. The tables are organized in accordance with standard statistical analysis terms. Table 2 (a response of a drive with ADEP 160 active) relative to table 1 (a response of a drive with ADEP 160 inactive) shows a dramatic improvement in maximum response time and standard deviation for writes. The maximum response time was improved by over 350%, and the standard deviation was improved by 100%. Inclusion and activation of ADEP 160, for a disc drive (such as DSD 100) tightens the response time mean for write-back data that has not been written to the disc 110, and read data that has not returned a command complete to the host 150.

Explanation of table terms:

| | |
|---|---|
| Variable: | Command operation type, read or write. |
| N: | Number of data samples. |
| Mean: | Sum of all response times divided by the number of data samples. |
| Median: | Value of the middle data sample. |
| StDev: | One sigma value. |
| SE Mean: | Standard error relative to the mean. |
| Minimum: | Smallest response time observed. |
| Maximum: | Maximum response time observed. |

TABLE 1

Results for: model using PCP 156, write cache enabled, and 50% writes.

| Variable | N | Mean | Median | TrMean | StDev | SE Mean | Minimum | Maximum | Q1 | Q3 |
|---|---|---|---|---|---|---|---|---|---|---|
| C2_Read | 49872 | 07.8798 | 7.2318 | 07.4732 | 04.1694 | 0.0187 | 0.3083 | 069.4911 | 5.4389 | 09.2953 |
| C2_Write | 50128 | 17.533 | 4.333 | 11.071 | 38.906 | 0.174 | 0.000 | 832.241 | 2.419 | 16.189 |

TABLE 2

Results for: model using PCP 156, write cache enabled, 50% writes, ADEP 160.

| Variable | N | Mean | Median | TrMean | StDev | SE Mean | Minimum | Maximum | Q1 | Q3 |
|---|---|---|---|---|---|---|---|---|---|---|
| C2_Read | 49850 | 08.0501 | 07.2888 | 07.6122 | 04.3588 | 0.0195 | 0.3451 | 048.1408 | 5.4705 | 09.4771 |
| C2_Write | 50150 | 20.003 | 11.974 | 18.183 | 19.618 | 0.088 | 0.000 | 177.757 | 3.710 | 33.081 |

Accordingly, embodiments of the present invention are generally directed to a method of transferring data from a memory (such as cache memory 138) to a storage media (such as disc 110) through execution of an aged data execution priority routine (such as 160) by a controller (such as 134) engaging process steps (such as shown by 200), which include, identifying a latency portion of a total access time of an aged data execution command (such as by step 212); selecting an additional command, executable within the identified latency portion (such as by step 216); and executing the additional command Within the identified latency portion (such as by step 218).

For purposes of the appended claims, the term "aged data execution priority routine" shall be defined in accordance with the flow of FIG. 4. The term "speculative data retention routine" shall be defined in accordance with the flow of FIG. 5. The term "pending command prioritization routine" shall be defined in accordance with the flow of FIG. 6. The term "write-back aging routine" shall be defined in accordance with the flow of FIG. 7.

The term "aged data execution command" shall be defined as a command associated with data to be written to or read from a data storage media, which has persisted in a memory a sufficient duration of time as to exceed a maximum specified aging limit. The recited "means for executing an execution command" shall be understood to correspond to the disclosed controller 134 programmed with at least one of the routines of FIGS. 4-7.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed within and by the appended claims.

What is claimed is:

1. A method comprising identifying a latency portion of a total access time of an aged data execution command and executing an additional command within said latency portion during execution of said aged data execution command.

2. The method of claim 1, further comprising executing a positioning portion of said aged data execution command to position a read/write head adjacent a storage medium prior to execution of a disc access portion of said aged data execution command.

3. The method of claim 2, further comprising determining a seek path for said read/write head to follow during execution of said positioning portion.

4. The method of claim 3, further comprising determining an alternate seek path for the read/write head to follow during said positioning portion prior to execution of said disc access portion of said aged data execution command.

5. The method of claim 4, in which said alternate seek path accommodates execution of both a positioning portion and a disc access portion of said additional command.

6. The method of claim 1, in which the aged data execution command is a command associated with a write-back data stored in a memory buffer for a period of time exceeding a predetermined period of time for storage of said write-back data in said memory buffer.

7. The method of claim 6, in which said data stored in said memory buffer is write-back data awaiting transfer from said memory buffer to a storage medium serviced by a read/write head.

8. The method of claim 1, in which the additional command executable within said latency portion is selected by steps comprising:

determining an ending position of a read/write head relative to a storage medium upon completion of a disc access portion of a command being processed by a control and interface electronics during a recognition of a presence of said aged data execution command;

ascertaining a total execution time for execution of each of a plurality of commands associated with a disc access based on said ending position of said read/write head; and selecting from said plurality of commands a command having a total execution time within said latency portion.

9. The method of claim 8, in which said total execution time for each command associated with a disc access includes a total access time portion, wherein said total access time portion is based on a comparison of said read/write head ending position and a beginning position of said read/write head for processing each said disc access associated with said each command.

10. The method of 9, in which a data associated with each command associated with said disc access is read data requested by a host.

11. The method of 9, in which a data associated with each command associated with said disc access is write-back data stored in a cache memory awaiting transfer to said storage medium.

12. The method of claim 1, wherein the aged data access command is a write command from a host to write data to a storage medium.

13. The method of claim 1, in which the additional command is a read data command associated with a read data requested by a host.

14. The method of claim 12, in which the additional command is a write data command associated with a write-back data stored in a cache memory awaiting transfer to said storage medium.

15. An apparatus comprising:

a head-media combination servicing data storage needs of a host; and a controller communicating between said head-media combination and said host, said controller programmed with an aged data execution priority routine which identifies a latency portion of a total access time of an aged data execution command and executes an additional command within said latency portion during execution of said aged data execution command.

16. The apparatus of claim 15, in which the head-media combination comprises a data storage disc.

17. The apparatus of claim 15, in which said additional command is a read command, and in which the aged data execution command is a write command.

18. The apparatus of claim 15, further comprising a cache memory communicating with said controller and a speculative data retention routine programmed into said controller, said speculative data retention routine improving data throughput between said host and said head-media combination by steps comprising:

storing in said cache memory host data, read on arrival speculative data, and read look ahead speculative data components of a read data associated with a read data command;

prioritizing removal of said read data components from said cache memory in preparation for a response to an alternate need for said cache memory;

removing said host data component from said cache memory in response to an identified alternate need for said cache memory prior to removal of said read on arrival speculative data component in meeting said identified alternate need for said cache memory; and removing said read look ahead speculative data component subsequent to removal of said host data component and said read on arrival speculative data component, when said identified alternate need for said cache memory persists.

19. The apparatus of claim 15, further comprises a speculative data retention routine programmed into said controller, said speculative data retention routine improving data throughput between said host and said head-media combination by steps comprising:

identifying a pending command for execution;

determining an availability of an additional command executable during a total access time of said pending command; and executing said additional command while in route to an execution of a disc access portion of said pending command, when a total execution time of said pending command is unaffected by the execution of said additional command.

20. The apparatus of claim 15, further comprising a cache memory communicating with said controller, and a write-back aging routine programmed into said controller, said write-back aging routine improving data throughput between said host and said head-media combination by steps comprising:

identifying a cache memory utilization level for said cache memory;

selecting a data aging threshold limit based on said cache memory utilization level; and writing a write-back data stored in said cache memory to a storage medium when said write-back data exceeds said selected data aging threshold limit.

21. An apparatus comprising:

a data storage medium;

a host interface circuit for establishing a communication path between the data storage medium and a host device; and means for executing a second data transfer command during a latency portion of an aged first command.

* * * * *